July 2, 1929.  J. YACKLEY  1,719,578
ROTARY HARROW
Filed July 12, 1927
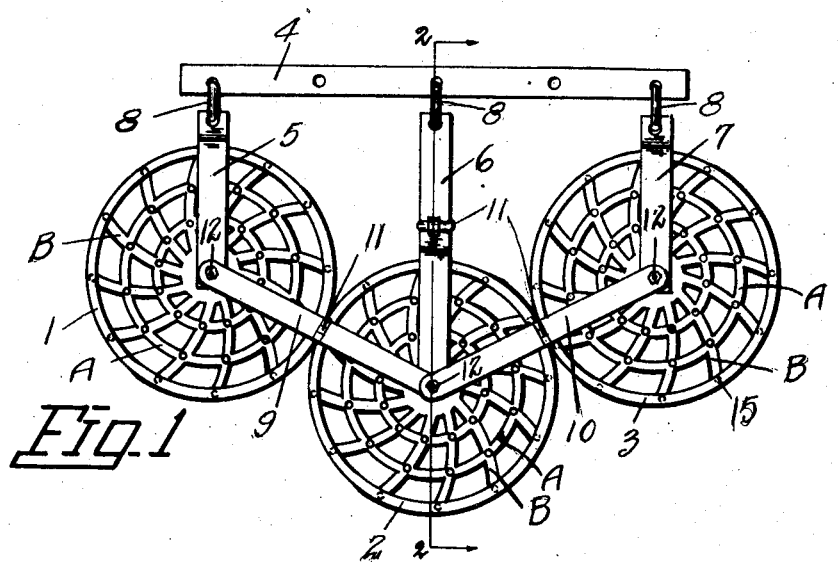
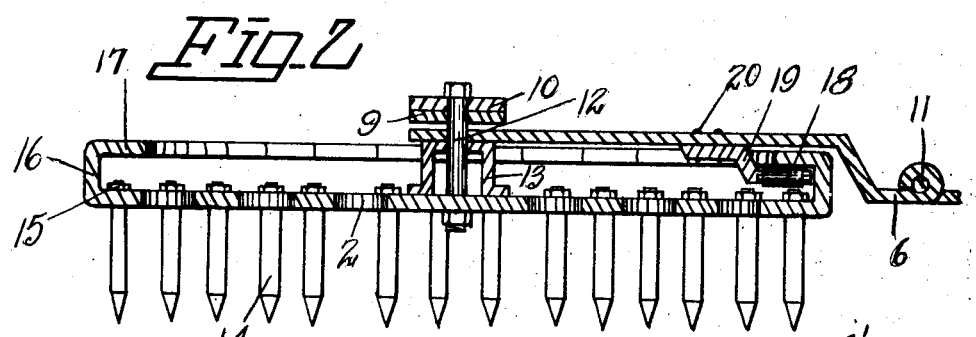
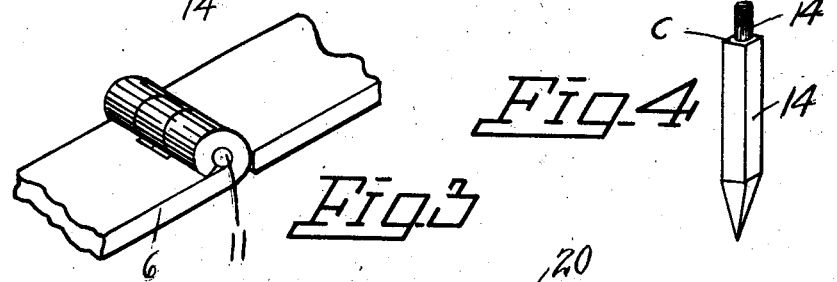
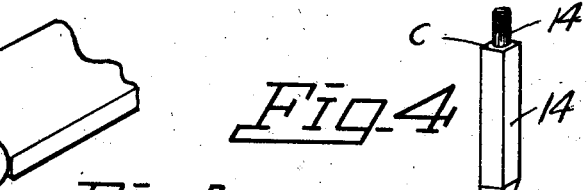
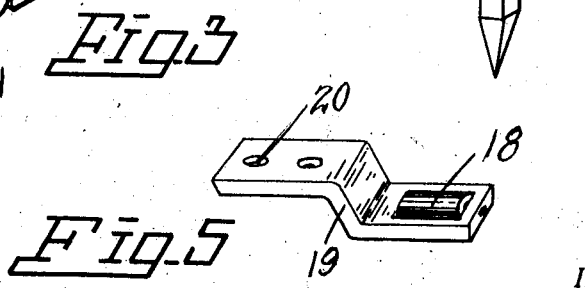
Inventor
Julius Yackley
By Herbert E. Smith
Attorney Patented July 2, 1929.

1,719,578

UNITED STATES PATENT OFFICE.

JULIUS YACKLEY, OF SPOKANE, WASHINGTON.

ROTARY HARROW.

Application filed July 12, 1927. Serial No. 205,104.

My present invention relates to an improved rotary harrow utilizing spike-shaped teeth carried by horizontally disposed, rotatable members that are flexibly connected and supported to rotate due to action of the teeth on the ground or soil, or due to frictional engagement of the tooth carrier with a stationary object, as a tree or tree stump. The harrow is especially useful in cultivating soil among trees, as in orchards, where accidental contact of one of the circular sections or carriers with a tree will result in a partial rotation of the section rather than bruising or tearing of the bark from the tree.
The harrow contemplates the use of a plurality of sections or teeth carriers constructed in novel fashion, and combined and arranged in such manner as to insure flexibility so that the implement may efficiently operate on irregular surfaces, as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1 is a plan view of an implement involving my invention.

Figure 2 is a vertical sectional view at line 2—2 of Figure 1.

Figure 3 is a perspective view showing a detail of a hinge joint in the frame work.
Figure 4 is a perspective view showing one of the teeth of the harrow.

Figure 5 is a perspective view showing an anti-friction roller and its bracket or carrier, one of which is used with each wheel or section of the harrow.

In the drawings I have illustrated an implement with three circular sections or wheels 1, 2, and 3, but it will be understood that this number may be increased or decreased if desired.

These sections are arranged to travel in horizontal position as the implement is drawn by a team of horses or other power coupled to the equalizing draft bar 4 that extends transversely of the implement at the front thereof.

A series of rearwardly extending draw bars as 5, 6, and 7 are coupled by clevises 8 to the equalizing draft bar, the two outer bars 5 and 7 being directly connected to the sections 1 and 3 respectively, and the intermediate bar 6 being connected to the intermediate section 2.

Laterally extending brace bars 9 and 10 extend outwardly from the center of the intermediate section 2 to the outer sections 1 and 3, and these bars, as well as the central draw bar 6 are hinged as at 11 to lend flexibility to the implement, as it travels over irregular surfaces of the ground, thus permitting the separate sections to remain in proper working position.

Each circular section is provided with a center bolt or post 12 rigidly secured thereto and a bolt support or brace 13 in the form of a flanged bushing is secured at the top face of the section to reinforce the bolt and hold it in rigid relation to the section. The bolts of the sections permit them to oscillate or revolve or rotate beneath the draw bars and braces forming the frame of the implement, and of course the bolts are the center of movement of their respective sections.

The sections are fashioned with grid-like bottoms comprising concentric circular bands or rings A and radially arranged, but curved spokes B that intersect these bands at regular intervals.

The teeth or spikes 14 are suspended below the sections from the intersections of the bands and spokes, and the threaded shanks 14' of the spikes or teeth are passed through openings at the intersections. Lock nuts 15 are tightened on the projecting ends of the threaded shanks and the teeth are clamped in the sections by the use of shoulders C on the teeth and the nuts. The teeth are staggered in their arrangement and the centrally pivoted or journaled section is adapted to oscillate or turn on its journal or bolt thus rendering the teeth effective in the cultivation of the soil.

The periphery of each section is fashioned as an annular vertical flange 16 which is designed to frictionally contact with a stone, tree stump or other object, and be instrumental in turning the section to prevent bruising or tearing of the bark on a tree and to prevent disruption of the flexibly joined parts of the implement.

Above the vertically arranged annular flange 16 is formed a horizontal, inwardly projecting flange 17 on the top of each section, and these top flanges are used in connection with anti-friction rollers 18, one for each section, to hold the sections in proper relation to the draw bars and brace bars forming the frame of the implement.

The friction rollers are journaled in the walls of holes or openings in angular brackets 19 that are fashioned with bolt holes 20 by means of which the angular brackets are bolted at the under sides of the frame bars. The brackets are attached at the undersides of the frame bars in such position that the rollers journaled in the brackets will engage under the top flanges of the sections and hold the sections and frame bars in proper relation.

The spokes and concentric bands of the sections may be fashioned as integral parts of the sections as indicated in the drawings, or these parts may be fashioned in other suitable manner. The hinges 11 of the frame bars, as best seen in Figure 2 are dropped down below the upper face of the top flange of the sections so that the pull or draw on the sections will not tend to topple over the section, but hold the teeth in proper position on the ground.

Various changes and alterations may be made within the scope of my appended claim without departing from the spirit of my invention.

Having thus fully described my invention, what I claim as new and desire to secure by Letters Patent is:—

In a rotary harrow the combination with a plurality of circular sections U-shaped in cross section and having teeth attached thereto, a center bolt for each section and flexible braces connecting the bolts of the sections, of draft means, flexible draw bars between the draft means and center bolts, brackets on the undersides of the draw bars, and anti-friction rollers journaled in the brackets for rolling contact with the underface of the top flange of the U-shaped sections.

In testimony whereof I affix my signature.

JULIUS YACKLEY.